US006736035B1

(12) United States Patent
Carstens

(10) Patent No.: US 6,736,035 B1
(45) Date of Patent: May 18, 2004

(54) ENGRAVER

(75) Inventor: Dieter Carstens, Kiel (DE)

(73) Assignee: Hell Gravure Systems GmbH, Kiel (DE)

(*) Notice: Subject to any disclaimer, the term of this patent is extended or adjusted under 35 U.S.C. 154(b) by 0 days.

(21) Appl. No.: 09/889,304

(22) PCT Filed: Nov. 4, 1999

(86) PCT No.: PCT/DE99/03521

§ 371 (c)(1), (2), (4) Date: Sep. 10, 2001

(87) PCT Pub. No.: WO00/43203

PCT Pub. Date: Jul. 27, 2000

(30) Foreign Application Priority Data

Jan. 25, 1999 (DE) ........................................ 199 02 884

(51) Int. Cl.[7] ............................ B23B 3/00; B23B 5/00

(52) U.S. Cl. ............................................ 82/1.4; 82/1.5

(58) Field of Search ................................ 82/1.11, 1.12, 82/1.4, 11.3, 12, 13, 82, 86, 93, 94, 95; 358/3.29; 324/125; 409/141

(56) References Cited

U.S. PATENT DOCUMENTS

| | | | | |
|---|---|---|---|---|
| 3,815,217 A | | 6/1974 | Baar | |
| 3,927,599 A | * | 12/1975 | Raymond | 409/90 |
| 3,964,382 A | | 6/1976 | Baar et al. | |
| 5,426,588 A | | 6/1995 | Walters et al. | |
| 5,440,398 A | * | 8/1995 | Holowko et al. | 358/3.29 |
| 5,605,097 A | * | 2/1997 | Ruckl et al. | 101/128.4 |
| 5,767,981 A | | 6/1998 | Fraser et al. | |
| 5,781,224 A | * | 7/1998 | Ruckl et al. | 347/248 |
| 5,831,746 A | * | 11/1998 | Seitz et al. | 358/3.29 |

FOREIGN PATENT DOCUMENTS

| | | |
|---|---|---|
| DE | 23 65 637 | 10/1975 |
| DE | 22 13 768 | 6/1978 |
| EP | 0 839 646 | 5/1988 |

* cited by examiner

*Primary Examiner*—Henry W. H. Tsai
(74) *Attorney, Agent, or Firm*—Schiff Hardin LLP

(57) ABSTRACT

In an engraver of an electrical engraving machine for engraving pressure cylinders, the engraver comprises a rotating system which oscillates around small angles. The engraver further comprises a drive system for the rotating system and of an engraving element that is arranged at the rotating system. The engraving element is used to grave cup-shapes in the pressure cylinder by carrying out a lifting movement directed at the pressure cylinder. The clearance angle of the engraver is arranged in a tilt in the direction of the engraving of the cup-shapes in relation to a line of reference which extends vertically to the generated surface of the pressure cylinder. The clearance angle is thus enlarged. Especially buckled cup-shapes can be engraved in the correct tone value using the tilted arrangement of the engraving element.

12 Claims, 2 Drawing Sheets

ENGRAVER

BACKGROUND OF THE INVENTION

The invention is in the field of electronic reproduction technology and is directed to an engraving element of an electronic engraving machine for engraving printing cylinders for rotogravure.

In an electronic engraving machine, an engraving element with an engraving stylus as a cutting tool moves in the axial direction along a rotating printing cylinder. Controlled by an engraving control signal, the engraving stylus cuts cups arranged in an engraving raster into the generated surface of the printing cylinder engraving line by engraving line. The engraving control signal is formed by superimposition of a periodic raster signal with image signal values that represent the tone values to be reproduced between "black" and "white". For generating the engraving raster, the raster signal effects a vibrating lifting motion of the engraving stylus in the direction of the printing cylinder, whereby the image signal values corresponding to the tone values to be reproduced determine the engraving depths of the cups.

DE-A-23 36 089 discloses an engraving element with an electromagnetic drive element for the engraving stylus. The electromagnetic drive element is composed of a stationary electromagnet charged with the engraving control signal in whose air gap the armature of a rotatory system moves. The rotatory system is composed of a shaft, the armature, a bearing for the shaft and of a damping device. One shaft end merges into a resilient torsion bar chucked spatially fixed, whereas the other shaft end carries a lever to which the engraving stylus is attached.

In practice, the engraving stylus is often a prismatically ground diamond that has its shank secured to the lever of the engraving element. The engraving stylus is essentially composed of a front face with respect to the engraving direction and of an obliquely proceeding, back flank facing away from the face. The intersection lines between the face and the flank form the cutting tip of the engraving stylus. The angle between the obliquely proceeding flank and the tangential plane in the point of contact between cutting tip and generated surface of the printing cylinder is referred to as relief angle.

The relief angle of the engraving stylus limits the steepness with which the engraving stylus can penetrate into the printing cylinder without the flank placing itself against the walls of the cup. For engraving different engraving rasters, cups that are flattened in the engraving line direction and have a steep wall and elongated cups with a shallow wall are engraved. When engraving flattened cups, it can disadvantageously occur that the flank of the engraving stylus touches down onto the walls of the cups and the cutting process is interrupted. The result is that the engraving depths required for tonally correct engraving are not achieved and cups having an undesired, asymmetrical shape are engraved.

In order to also be able to engrave flattened cups with steep walls without falsification of the tone value, the relief angle would have to be correspondingly enlarged. However, it has been shown in practice that the risk of breakage of the cutting tip of the diamond increases given an enlarged relief angle. Frequent replacement of the engraving stylus as well as time-consuming and costly re-engravings would be the result.

SUMMARY OF THE INVENTION

It is an object of the invention to improve an engraving element of an electronic engraving machine for engraving printing forms such that, in particular, a tonally correct engraving is achieved even given flattened cups.

According to the present method and apparatus of the invention, an engraving element is provided for an electronic engraving machine for engraving printing cylinders. A rotary system oscillates by small angles. A drive system for the rotary system is provided. An engraving stylus is attached to the rotary system for engraving cups in the printing cylinder, the engraving stylus respectively implementing a stroke motion directed onto the printing cylinder for engraving a cup. For enlarging a relief angle of the engraving stylus, the engraving stylus is arranged tilted in an engraving direction of the cups with respect to a reference straight line that proceeds perpendicular to a generated surface of the printing cylinder.

The invention is explained in greater detail below on the basis of FIGS. 1 and 2.

DESCRIPTION OF THE PREFERRED EMBODIMENTS

Figure 1:
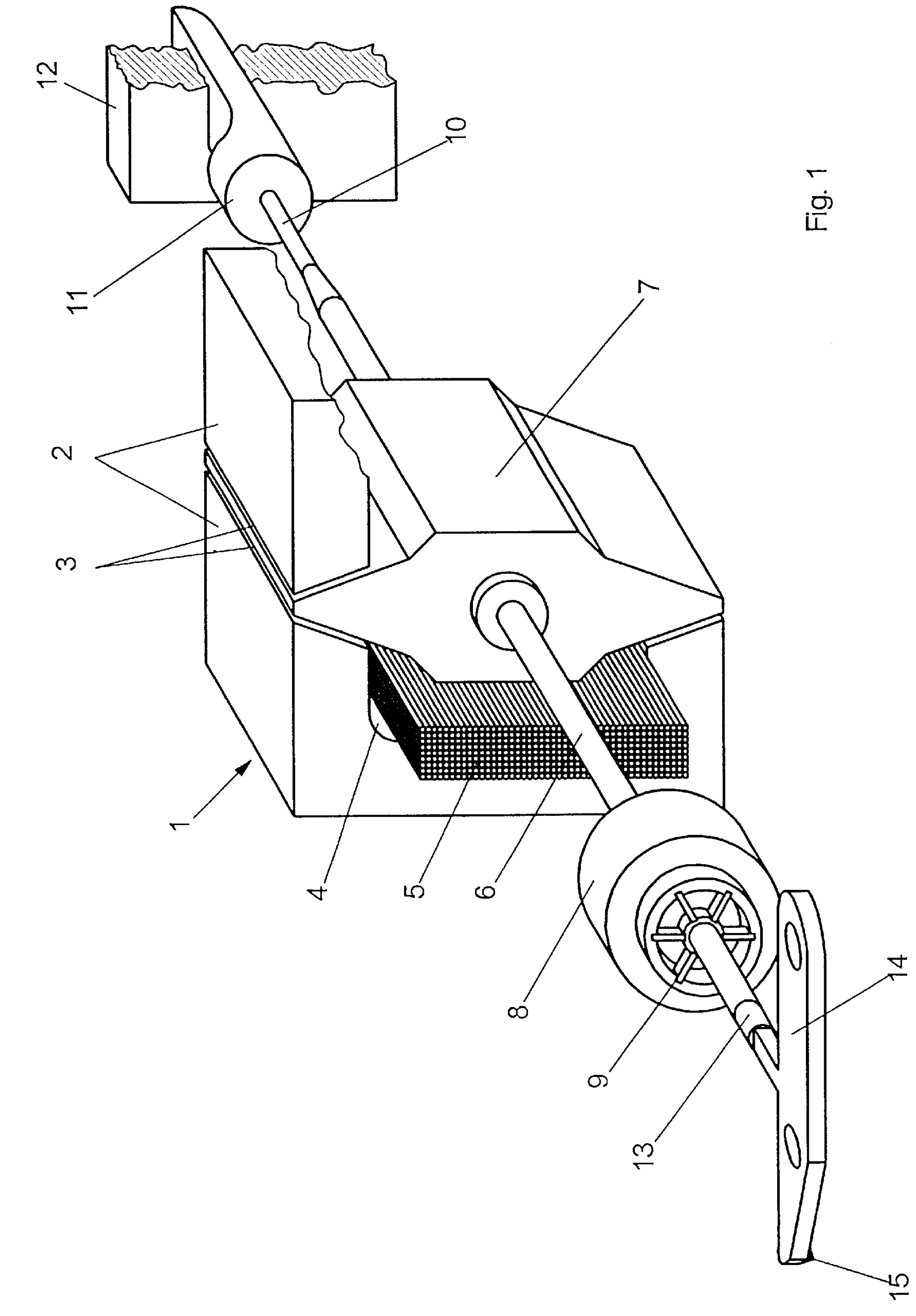
FIG. 1 illustrates the fundamental structure of an engraving element.

For the purposes of promoting an understanding of the principles of the invention, reference will now be made to the preferred embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

FIG. 1 shows a perspective illustration of the structure of an engraving element, which fundamentally comprises a drive system, an electromagnetic drive system in the illustrated example, and a rotatory system.

The electromagnetic drive element comprises a stationary electromagnet 1 having two u-shaped lamination bundles 2 lying opposite one another and two air gaps 3 lying between the legs of the lamination bundles 2. A coil 5, of which only one coil side is shown, is situated in the recesses 4 of the lamination bundles 2 of the electromagnet 1. An engraving control signal flows through the coil 5.

The rotatory system comprises a shaft 6, an armature 7 secured to the shaft, as well as a damping device 8 and a bearing 9 for the shaft 6. The armature 7 is movable in the air gaps 3 of the electromagnet 1. One shaft end merges into a resilient torsion bar 10 that is chucked in a stationary bearing 11, 12. The other shaft end 13 carries a lever 14 to which an engraving stylus 15, for example in the form of a diamond, is attached. The damping device 80 and the bearing 9 are arranged between the armature 7 and the lever 14 with the engraving stylus 15.

As a result of the magnetic field generated in the air gaps 2 of the electromagnet 1, an electrical torque is exerted on the armature 7 of the shaft, this electrical torque being opposed by the mechanical torque of the torsion bar 10. The electrical torque turns the shaft 6 out of a quiescent position around its longitudinal axis with a rotational angle proportional to the respective value of the engraving control signal, and the torsion bar 10 returns the shaft 6 into the quiescent position. Due to the rotation of the shaft 6, the engraving stylus 15 executes a stroke motion directed in the direction onto the generated surface of a printing cylinder (not shown), the stroke motion defining the penetration depth of the engraving stylus 15 into the printing cylinder. The drive system for the engraving stylus 15 can also be designed as a solid-state actuator element that, for example, comprises of a piezoelectric or a magnetostrictive material.

Figure 2:
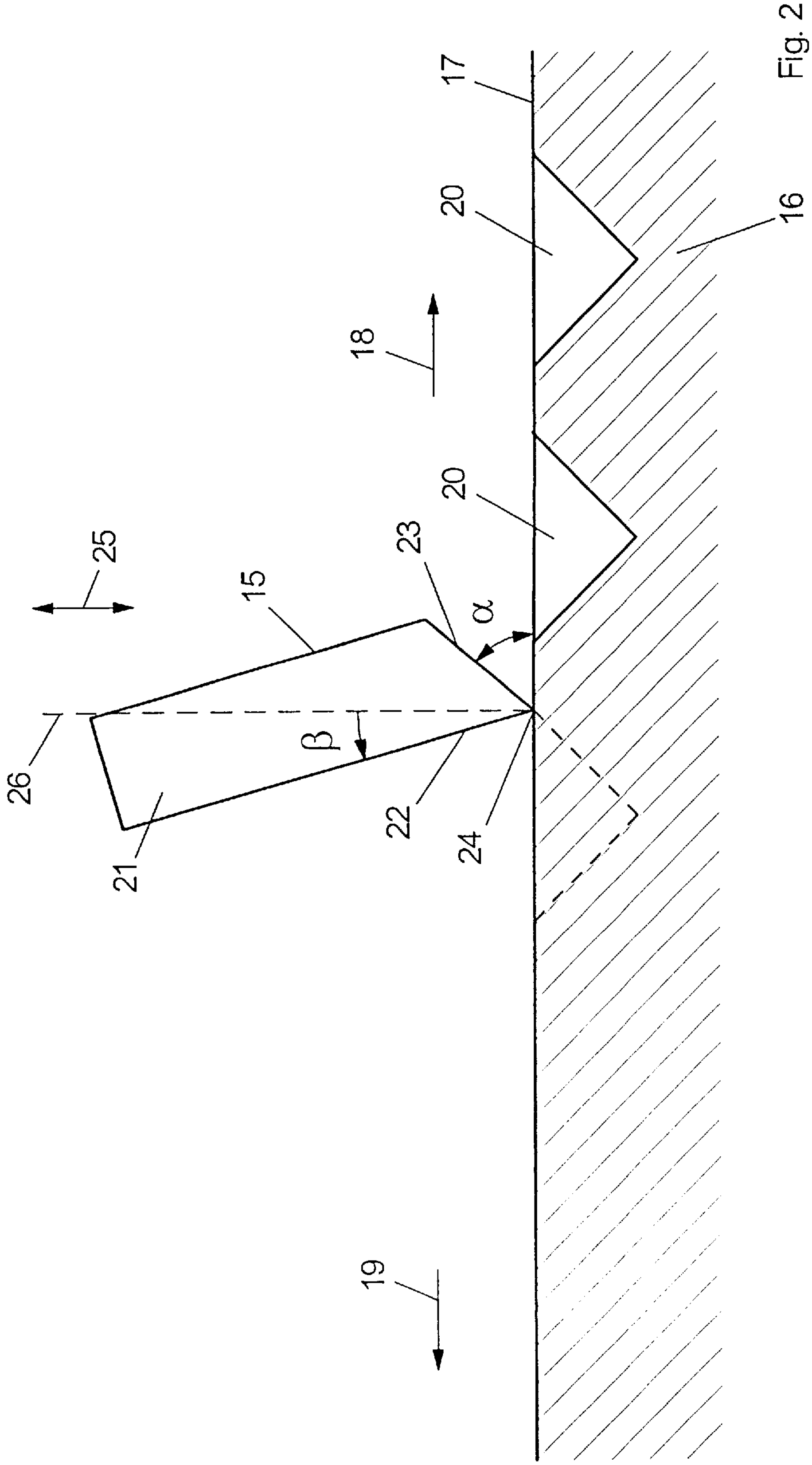
FIG. 2 shows an engraving stylus and a printing cylinder (portions thereof) shown in cross-section.

FIG. 2 shows a cross-section through the engraving stylus and a printing cylinder. What is shown is a radial partial cross-section through a printing cylinder 16 in the region of its generated surface 17. The engraving stylus 15 designed as a prismatically ground diamond is also shown in cross-section. Let the rotating printing cylinder 16 move under the engraving stylus 15 along the direction of an arrow 18, whereby an arrow 19 indicates the engraving direction for the cups 20 on a circumferential engraving line on the generated surface 17 of the printing cylinder 16.

The engraving stylus 15 comprises a shank 21 of a front face 22 with respect to the engraving direction 19 and of a flank 23 facing away from the face 22. The intersection lines between the face 22 and the flank 23 form the cutting tip 24 of the engraving stylus 15. The flank describes the relief angle $\alpha$ with a tangential surface in the point of contact between cutting tip 24 and generated surface 17 of the printing cylinder 16.

The engraving element (not shown) is directed relative to the generated surface 17 of the printing cylinder 16 such that, for engraving the cups 20, the engraving stylus 15 implements a stroke motion in the direction onto the printing cylinder 16 and in the opposite direction, as indicated by a double arrow 25.

In order, in particular, to be able to engrave flattened cups 20 with correct tone value, the relief angle $\alpha$ of the engraving stylus 15 is enlarged according to the invention in that the engraving stylus 15 is arranged inclined in the engraving direction 19 relative to a reference straight line 26 respectively proceeding radially relative to the printing cylinder 16, i.e. perpendicular to the generated surface 17. The angle of inclination $\beta$ that the inclined engraving stylus 150 described with the reference straight line 26 is expediently selected 1° through 5°, and preferably 3°. As a result of the inventive technique, the wedge angle between face 22 and flank 23 of the engraving stylus 15 is preserved, as a result of which the risk of stylus breakage is advantageously minimal despite the enlarged relief angle $\alpha$.

In a first exemplary embodiment, the tilting of the engraving stylus 150 relative to the generated surface 17 is achieved by a correspondingly tilted fastening—for example, by gluing—of the engraving stylus 15 in the lever 14 of the engraving element. The location-exact insertion of the engraving stylus 15 into the lever 14 is implemented, for example, with a mounting mechanism according to German Letters Patent 22 13 768.

In a second exemplary embodiment, the tilting of the engraving stylus 15 is achieved by means of a structure inclination of the longitudinal axis of the rotatory system 6, 7, 8, 9 of the engraving element relative to a reference tangent placed against the generated surface 17 of the printing cylinder 16.

While the invention has been illustrated and described in detail in the drawings and foregoing description, the same is to be considered as illustrated and not restrictive in character, it being understood that only the preferred embodiment has been shown and described and that all changes and modifications that come within the spirit of the invention are desired to be protected.

What is claimed is:

1. An engraving element of an electronic engraving machine for engraving printing cylinders, comprising:

a rotatory system oscillating by small angles;

a drive system for the rotatory system;

an engraving stylus having a front face and a back face attached to the rotatory system for engraving cups in the printing cylinder with a cutting tip, the cutting tip being defined by an intersection of said front face and a flank surface extending from said back face to said intersection, the front face and flank surface defining a wedge angle, the engraving stylus respectively implementing a stroke motion defined by said small angle oscillating and directed onto the printing cylinder for engraving a cup; and for enlarging a relief angle of the engraving stylus defined by said flank surface and a tangent to said generated surface of the printing cylinder without reducing said wedge angle, the engraving stylus being tilted in an engraving direction of the stylus relative to the cups by a supplemental angle of inclination of the front face which supplements an angle of inclination of the front face caused by said small angle oscillating with respect to a reference straight line that proceeds perpendicular to said generated surface of the printing cylinder.

2. The engraving element according to claim 1 wherein said supplemental angle of inclination of the engraving stylus relative to the reference straight line amounts to between 1° and 5°.

3. The engraving element according to claim 2 wherein the supplemental angle of inclination of the engraving stylus relative to the reference straight line amounts approximately to 3°.

4. The engraving element according to claim 1 wherein the rotatory system comprises:

a shaft oscillating with small rotational angles;

a lever located at an end of the shaft and to which the engraving stylus is attached;

a bearing for the shaft;

a restoring element for the shaft; and a damping device attached at the shaft.

5. The engraving element according to claim 4 wherein the engraving stylus is secured to the lever and is tilted by said supplemental angle of inclination.

6. The engraving element according to claim 4 wherein the shaft, as compared to its normal attitude, is rotated by a supplemental additional angle to create said supplemental angle of inclination of the engraving stylus relative to the printing cylinder.

7. The engraving element according to claim 4 wherein the engraving stylus is secured to the lever by gluing.

8. The engraving element according to claim 1 wherein the engraving stylus is a diamond.

9. The engraving element according to claim 4 wherein the damping device and the bearing for the shaft are arranged between the drive system and the lever.

10. An engraving element of claim 1 wherein an angle of inclination of the tilted engraving stylus is defined by the reference straight line and the front face of the engraving stylus.

11. A method for engraving a printing cylinder in an electronic engraving machine, comprising the steps of:

providing an engraving stylus having a front face and a back face and having a cutting tip defined by an intersection of said front face and a flank surface extending from said back face to said intersection for engraving cups in a generated surface of the printing cylinder, the first face and flank surface defining a wedge angle;

oscillating the engraving stylus cutting tip by small angles towards and away from the generated surface to create the cups while the generated surface is moving relative to the engraving stylus; and enlarging a relief angle of the engraving stylus defined by the flank surface and a tangent to said generated surface without reducing said wedge angle by tilting the engraving stylus in an engraving direction of the stylus relative to the cups by a supplemental angle to supplement an inclination of the engraving stylus caused by said oscillating small angles so that a substantial angle of inclination defined by said front face of the stylus with respect to a reference straight line proceeding perpendicular to the generated surface of the printing cylinder is provided.

12. The method of claim 11 including the step of providing the supplemental angle of inclination between 1° and 5°.

* * * * *